United States Patent
Kwon et al.

(10) Patent No.: US 10,639,992 B2
(45) Date of Patent: May 5, 2020

(54) VEHICLE AND METHOD OF CONTROLLING THE SAME

(71) Applicant: Hyundai Motor Company, Seoul (KR)

(72) Inventors: Gideok Kwon, Seoul (KR); Jong Bok Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/364,318

(22) Filed: Nov. 30, 2016

(65) Prior Publication Data

US 2017/0253121 A1 Sep. 7, 2017

(30) Foreign Application Priority Data

Mar. 4, 2016 (KR) .................. 10-2016-0026190

(51) Int. Cl.
*B60K 35/00* (2006.01)
*G06F 3/0484* (2013.01)
*G06F 3/0488* (2013.01)
*G06F 3/0354* (2013.01)
*B60K 37/06* (2006.01)
(Continued)

(52) U.S. Cl.
CPC .............. *B60K 35/00* (2013.01); *B60J 7/043* (2013.01); *B60K 37/06* (2013.01); *B60N 2/0224* (2013.01); *B60N 2/0228* (2013.01); *B60N 2/0248* (2013.01); *B60R 1/062* (2013.01); *G06F 3/03547* (2013.01); *G06F 3/044* (2013.01); *G06F 3/04847* (2013.01); *G06F 3/04883* (2013.01); *B60J 7/0573* (2013.01); *B60K 2370/143* (2019.05); *B60K 2370/146* (2019.05); *B60K 2370/1438* (2019.05);
(Continued)

(58) Field of Classification Search
CPC combination set(s) only.
See application file for complete search history.

(56) References Cited

U.S. PATENT DOCUMENTS

2005/0052426 A1* 3/2005 Hagermoser .......... B60K 35/00
345/173
2014/0118641 A1* 5/2014 Ryu ..................... G06F 1/1692
349/12
(Continued)

FOREIGN PATENT DOCUMENTS

JP    2014-160558 A    9/2014
KR    10-1183144      9/2012
(Continued)

OTHER PUBLICATIONS

Wikipedia, Molded Interconnect Device, https://web.archive.org/web/20141126183909/https://en.wikipedia.org/wiki/Molded_interconnect_device. (Year: 2014).*
(Continued)

*Primary Examiner* — Aaron L Troost
(74) *Attorney, Agent, or Firm* — Mintz Levin Cohn Ferris Glovsky and Popeo, P.C.; Peter F. Corless

(57) ABSTRACT

A vehicle and a control method of the vehicle are provided. The vehicle includes at least one touch input device that is mounted within the vehicle and configured to sense a touch input of a user based on an electrode pattern mounted on a base thereof by forming an electrode on an injection object. Additionally, a controller operates apparatuses mounted within the vehicle based on the sensed touch input.

9 Claims, 25 Drawing Sheets

(51) Int. Cl.
*B60N 2/02* (2006.01)
*B60J 7/043* (2006.01)
*B60R 1/062* (2006.01)
*G06F 3/044* (2006.01)
*B60J 7/057* (2006.01)

(52) U.S. Cl.
CPC .............. *B60K 2370/1446* (2019.05); *B60K 2370/1468* (2019.05); *G06F 2203/04103* (2013.01)

(56) References Cited

U.S. PATENT DOCUMENTS

2016/0342215 A1* 11/2016 Endo .................. G06F 3/016
2017/0249041 A1* 8/2017 Moller ................ G06F 3/0414

FOREIGN PATENT DOCUMENTS

| KR | 10-2013-0071013 A | | 6/2013 | |
|----|-------------------|---|--------|---|
| KR | 20130071013 A | * | 6/2013 | |
| KR | 10-2014-0127734 A | | 11/2014 | |
| KR | 10-1457337 | | 11/2014 | |
| KR | 10-2015-0113917 | | 10/2015 | |
| WO | WO-2015121964 A1 | * | 8/2015 | ............. G06F 3/016 |

OTHER PUBLICATIONS

Paik, Byoung Man, "Study on the Formulation Mechanism of Electroless Plating Seeds on Polymer by Laser", Journal of the Korean Society for Precision Engineering, vol. 29, No. 1, pp. 41-47 (Jan. 2012).

* cited by examiner

VEHICLE AND METHOD OF CONTROLLING THE SAME

CROSS-REFERENCE TO RELATED APPLICATION(S)

This application claims the benefit of Korean Patent Application No. 10-2016-0026190, filed on Mar. 4, 2016 in the Korean Intellectual Property Office, the disclosure of which is incorporated herein by reference.

BACKGROUND

1. Field of the Disclosure

The present disclosure relates to a vehicle that senses various touch input patterns via touch input devices and methods of controlling the apparatuses within the vehicle using the input patterns.

2. Description of the Related Art

With the development of the automotive industry, vehicles are being equipped with various functions for passenger convenience in addition to primary functions of traveling on roads. As functions of vehicles become more diverse, a driver's load of manipulating the vehicle may increase. The increase in manipulation load may deteriorate concentration on driving, thereby threatening safe driving. In addition, as the number of functions increases, manipulation of the vehicle may become more complex. Thus, a driver may not efficiently utilize the functions of the vehicle. In order to reduce inconvenience described above, research regarding an input device for vehicles to reduce manipulation load and manipulation inconvenience of drivers has been conducted.

SUMMARY

In accordance with one aspect of the present disclosure, a vehicle includes at least one touch input device disposed within the vehicle and is configured to sense a touch input of a user based on an electrode pattern mounted on a base by creating an electrode on an injection object; and a controller configured to operated apparatuses mounted within the vehicle based on the sensed touch input.

In particular, when the base of the touch input device has a multi-curved surface shape, and the electrode pattern is designed to correspond to a shape of the base of the touch input device. The touch input device is fabricated by forming a pattern groove on the base by emitting laser beams, and disposing the electrode pattern comprising a conductive material and a wiring unit configured to connect the electrode pattern with a circuit board in the pattern groove Additionally, the touch input device may be configured to receive a control command from at least one apparatus by sensing a touch input pattern including at least one selected from the group consisting of the number of repeated touches for a predetermined time period, an intensity of touch, and a direction of dragging after touching. The touch input device may include at least one selected from the group consisting of a first touch input device configured to receive a control command regarding a side mirror, a second touch input device configured to receive a control command regarding an electromotive seat, and a third touch input device configured to receive a control command regarding a sunroof, via a touch input.

The controller may be configured to adjust a rotating direction and a rotating degree the side mirror based on a touch input pattern received via the first touch input device.

In addition, the controller may be configured to adjust a position of the electromotive seat based on a touch input pattern received via the second touch input device. The controller may be configured to adjust a direction of opening and closing the sunroof and a degree of opening and closing the sunroof based on a touch input pattern received via the third input device. The controller may further be configured to provide a function notifying service by operating the apparatuses mounted within the vehicle when a touch input is sensed on a touch area of the touch input device for a predetermined first time period.

In accordance with another aspect of the present disclosure, a method of controlling a vehicle may include: receiving a control command via at least one touch input device mounted within the vehicle and including an electrode pattern mounted on a base by creating an electrode on an injection object; and operating an apparatus mounted within the vehicle based on the recognized control command. In particular, a control command may be detecting from at least one apparatus by sensing a touch input pattern including at least one selected from the group consisting of the number repeated touches for a predetermined time period, an intensity of touch, and a direction of dragging after touching.

Additionally, the control command may be received via at least one selected from the group consisting of a first touch input device configured to receive a control command regarding a side mirror, a second touch input device configured to receive a control command regarding an electromotive seat, and a third touch input device configured to receive a control command regarding a sunroof, via a touch input. In particular, the operating of the apparatus may include adjusting a rotating direction and a rotating degree of the side mirror based on a touch input pattern received via the first touch input device, adjusting a position of the electromotive seat based on a touch input pattern received via the second touch input device, adjusting a direction of opening and closing the sunroof and a degree of opening the sunroof based on a touch input pattern received via the third input device. A function notifying service may be further provided by operating an apparatus mounted within the vehicle when a touch input is sensed on a touch area of the touch input device for a predetermined first time period.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Figure 1:
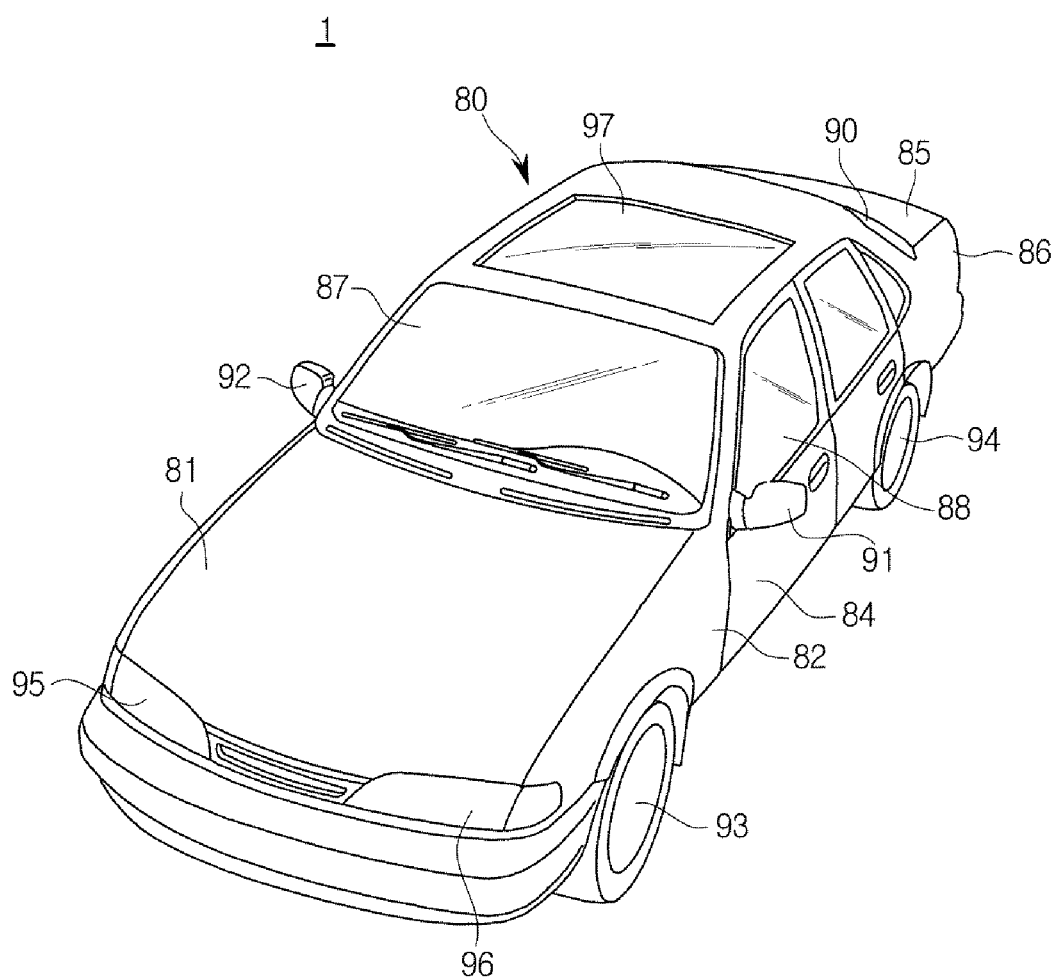
FIG. 1 is an exterior view of a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that, although the terms "first", "second", etc., may be used herein to describe various elements, these elements should not be limited by these terms. The above terms are used only to distinguish one component from another. For example, a first component discussed below could be termed a second component, and similarly, a second component may be termed a first component without departing from the teachings of this disclosure. As used herein, the term "and/or" includes any and all combinations of one or more of the associated listed items.

In addition, the terms "unit", "device," "block", "member", and "module" used herein refer to a unit which can be embodied as software stored in a memory, hardware such as field-programmable gate array (FPGA) or application specific integrated circuit (ASIC), or a combination thereof, for processing at least one function and performing an operation. However, the terms "unit", "device," "block", "member", and "module" are not limited to software or hardware. The "unit", "device," "block", "member", and "module" may be stored in a storage medium and implemented by one or more processors.

Reference will now be made in detail to the exemplary embodiments of the present disclosure, examples of which are illustrated in the accompanying drawings, wherein like reference numerals refer to like elements throughout.

Figure 2:
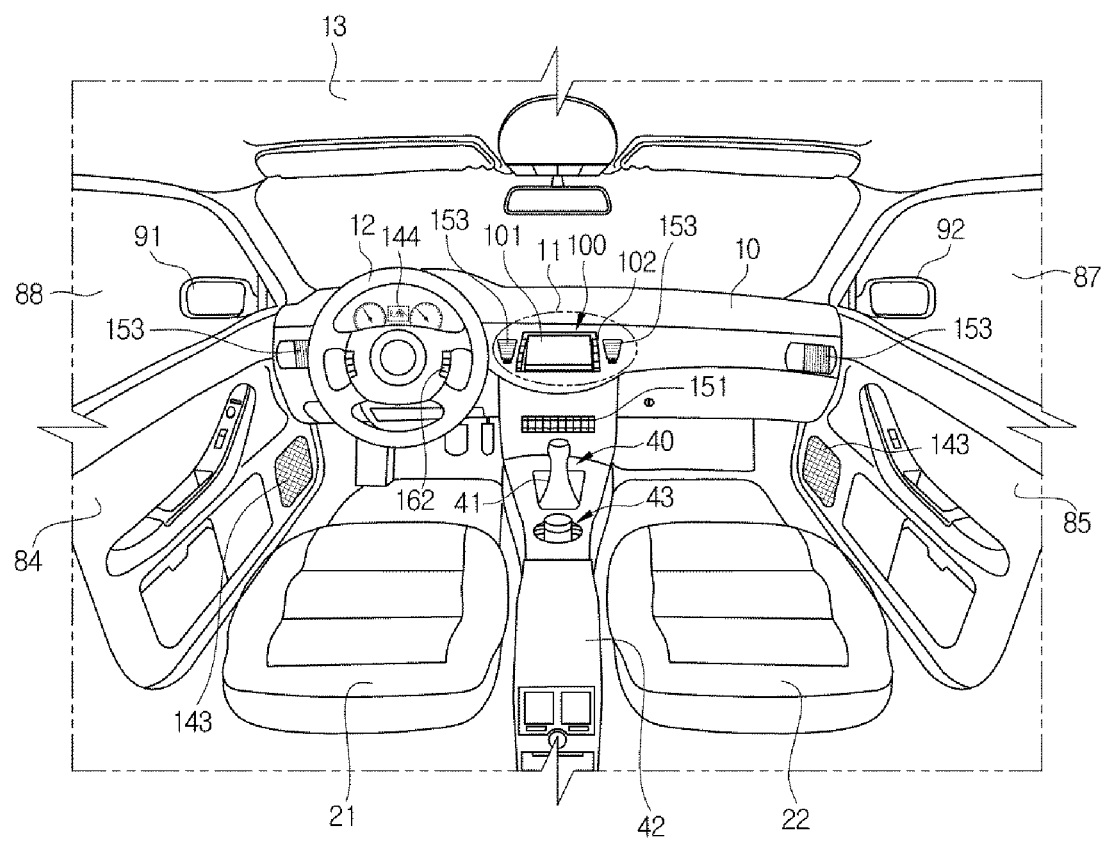
FIG. 2 is an interior view of the vehicle according to an exemplary embodiment of the present disclosure.
Figure 3:
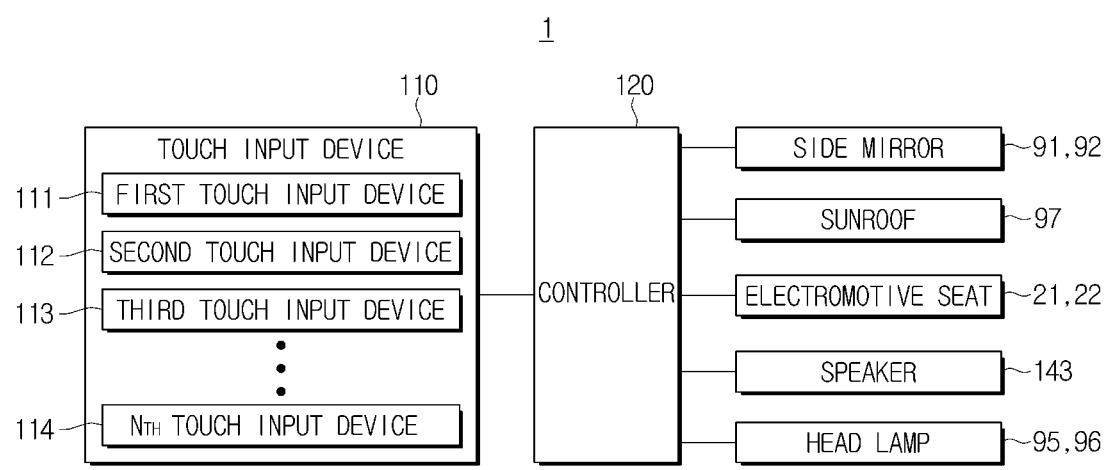
FIG. 3 is a control block diagram of the vehicle exemplary embodiment of the present disclosure.
Figure 4A:
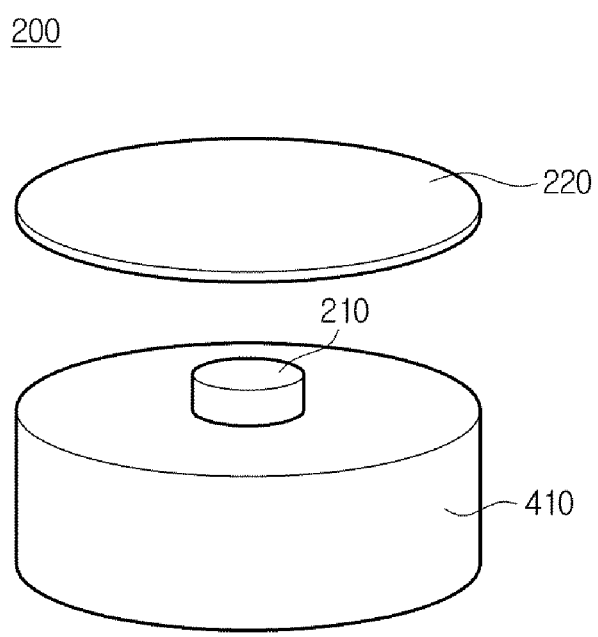
FIG. 4A—is a view schematically illustrating a structure of a conventional input device implemented as a switch according to the related art and FIG. 4B is a view illustrating a structure of a touch input device according to an exemplary embodiment of the present disclosure.
Figure 4B:
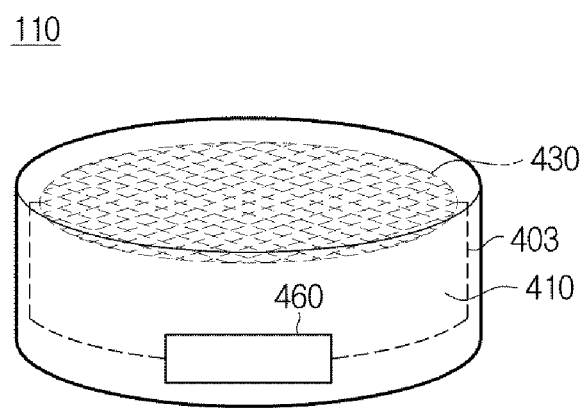
Figure 5:
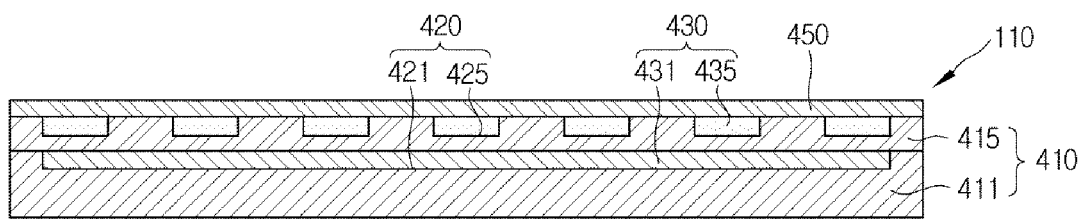
FIG. 5 is a schematic cross-sectional view of the touch input device according to an exemplary embodiment of the present disclosure.
Figure 6:
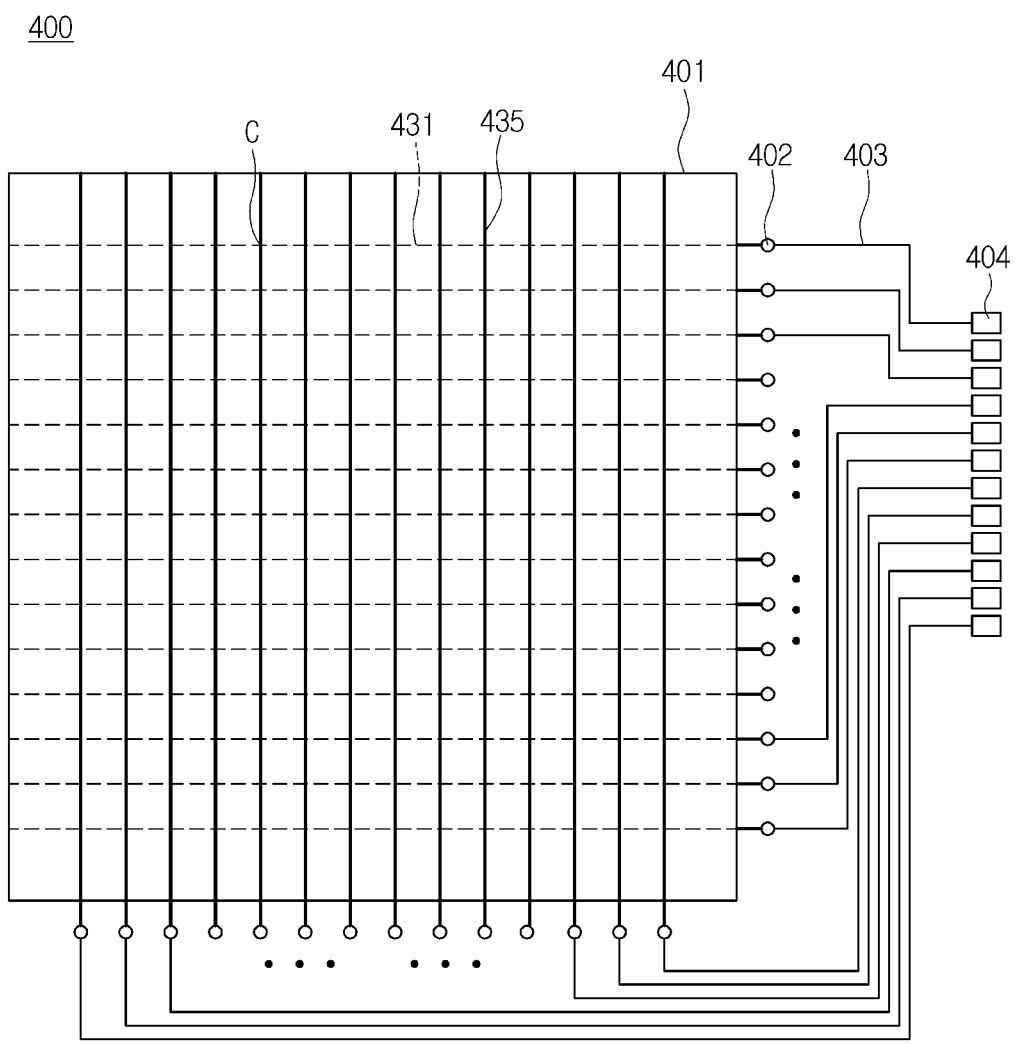
FIG. 6 is a view illustrating an electrode pattern provided on the surface of the touch input device according to an exemplary embodiment of the present disclosure.

FIG. 1 is an exterior view of a vehicle according to an exemplary embodiment. FIG. 2 is an interior view of the vehicle according to an exemplary embodiment. FIG. 3 is a control block diagram of the vehicle according to an exemplary embodiment. FIGS. 4A-4B are views illustrating a structure of a touch input device according to an exemplary embodiment. FIG. 5 is a schematic cross-sectional view of the touch input device according to an exemplary embodiment. FIG. 6 is a view illustrating an electrode pattern provided on the surface of the touch input device according to an exemplary embodiment. Hereinafter, the drawings will be synthetically described to avoid repeated descriptions.

Referring to FIG. 1, a vehicle 1 includes a body 80 that defines an external appearance of the vehicle 1 and wheels 93 and 94 configured to move the vehicle 1. The body 80 includes a hood 81, front fenders 82, doors 84, a trunk lid 85, and quarter panels 86. As illustrated in FIG. 1, the body 80 may further include a sunroof 97.

The exterior of the body 80 may include a front window 87 installed at a front portion of the body 80 and that provides a view in front of the vehicle 1, side windows 88 that provide side views, side mirrors 91 and 92 installed at the doors 84 and configured to provide rear views and side views of the vehicle 1, and a rear window 90 installed at a rear portion of the body 80 and configured to provide a view behind the vehicle 1. The exterior of the body 80 may also include head lamps 95 and 96, i.e., headlights, installed at front portions of the vehicle 1 and configured to emit light to obtain a view in front of the vehicle 1. Additionally, the exterior of the body 80 may include tail lamps (not shown), i.e., taillights, installed at rear positions of the vehicle 1 and configured to emit light to obtain a view behind the vehicle 1 and inform a vehicle behind the vehicle 1 of a position of the vehicle 1.

Meanwhile, the sunroof 97, the head lamps 95 and 96, and the tail lamps of the vehicle 1 may be operated in accordance with a manipulation command of a user. Since the vehicle 1 according to an exemplary embodiment may include a touch input device, the user may efficiently and conveniently operate the constituent elements described above. This will be described later. Hereinafter, the interior of the vehicle 1 will be described in detail.

The interior of the vehicle 1 may include an air conditioner. The air conditioner, which will be described herein, refers to an apparatus that adjusts an air temperature within the vehicle including adjusting indoor/outdoor environmental conditions, absorption/discharge of air, air circulation, cooling/heating states automatically or in accordance with a control command of the user. For example, the vehicle 1 may include the air conditioner to heat and cool the inside of the vehicle 1 and adjust temperature inside the vehicle 1 by discharging heated or cooled air thereto via a vent 153.

The interior of the vehicle 1 may also include an audio video navigation (AVN) terminal 100. Particularly, the AVN terminal 100 refers to a terminal that provides the user with navigation functions and also integrated operation of audio and video functions. In addition, the AVN terminal 100 may operate apparatuses mounted within the vehicle 1 by generating a control signal in accordance with a control command of the user input via various input devices. For example, the AVN terminal 100 may be configured to selectively display at least one of from an audio screen, a video screen, and a navigation screen via a display 101 and also display various control screens related to operation of the vehicle 1.

The display 101 may be disposed at a center fascia 11 located at a central region of a dashboard 10. According to an exemplary embodiment, the display 101 may be implemented using a liquid crystal display (LCD), a light emitting diode (LED), a plasma display panel (PDP), an organic light emitting diode (OLED), or a cathode ray tube (CRT), without being limited thereto. When the display 101 is a touchscreen type display, the display 101 may be configured to receive diverse control commands from the user via various touch manipulation such as touch, click, drag, or the like.

Meanwhile, a navigation input unit 102 may be a hard key type disposed adjacent to the display 101. Thus, a driver may input various control commands by manipulating the navigation input unit 102. In addition, a center console 40 may include a jog shuttle type or hard key type central input unit 43. The center console 40 is located between a driver seat 21 and a front passenger seat 22 and may include a gear manipulation lever 41 and a tray 42. The central input unit 43 may perform a part of or all functions of the navigation input unit 102.

Meanwhile, at least one of the driver seat 21 and the front passenger seat 22 may be implemented using an electromotive seat. Thus, the user may adjust the position of the seat by manipulating an input device disposed at one side of the seat. Hereinafter, a case in which both the driver seat 21 and the front passenger seat 22 are electromotive seats will be described.

In addition, the interior of the vehicle 1 may include an instrument cluster 144 which may also be referred to as an instrument panel. Hereinafter, the instrument cluster 144 will be used for descriptive convenience. A driving speed of the vehicle 1, a revolution per minute (RPM) of an engine, a fuel level, and the like may be displayed on the instrument cluster 144. The instrument cluster 144 may operate in cooperation with a AVN terminal 100 to display a driving route and may also display information regarding driving environments of roads such as speed limits. In addition, the instrument cluster 144 is not limited thereto.

The vehicle 1 may further include a speech input unit 190. For example, the speech input unit 190 may be implemented using a microphone. The speech input unit 190 may be configured to receive a speech command from the driver via the microphone and convert the speech command into an electric signal. The interior of the vehicle 1 may further include a speaker to output sounds. Accordingly, the vehicle 1 may be configured to output sounds required to perform the audio functions, video functions, navigation functions, and other additional functions through the speaker 143. For example, the vehicle 1 may provide the driver with a route toward a destination via the speaker 143, and the speaker 143 is not limited thereto.

Meanwhile, various other input devices configured to receive control commands related to the apparatuses described above may also be provided within the vehicle 1 in addition to the aforementioned navigation input unit 102 and central input unit 43. For example, the vehicle 1 may include devices configured to receive control commands with regard to at least one apparatus mounted within the vehicle 1 such as an input device disposed at one side of the electromotive seats 21 and 22 and configured to receive a control command with regard to a seat position and an input device configured to receive a control command with regard to opening and closing of the sunroof 97 and the degree of opening and closing thereof. Hereinafter, a control block diagram of the vehicle 1 including a touch input device replacing one of the devices to receive control commands with regard to at least one apparatus mounted within the vehicle 1 will be described.

Referring to FIG. 3, the vehicle 1 may further include a touch input device 110 and a controller 120 in addition to the side mirrors 91 and 92, the sunroof 97, the electromotive seats 21 and 22, the speaker 143, and the head lamps 95 and 96. Since the side mirrors 91 and 92, the sunroof 97, the electromotive seats 21 and 22, the speaker 143, and the head lamps 95 and 96 are as described above, descriptions thereof will be not repeated. The touch input device 110 refers to a device configured to receive various control commands by sensing touch manipulation of the user. The user may instinctively input various control commands via the touch input device 110 without complex manipulation. In other words, the user may input a desired control command via a touch input as well as a speech or manipulation of the jog shuttle type or hard key type input unit as described above.

The touch input device 110, which will be described later, may replace the aforementioned devices configured to receive the control commands from the user. For example, the touch input device 110 may include a first touch input device 111, a second touch input device 112, a third touch input device 113, and an $N^{th}$ touch input device 114 (where N≥4) replacing the devices configured to receive control commands from the user as illustrated in FIG. 3. Hereinafter, an inner structure of the touch input device will be described.

FIG. 4A is a view schematically illustrating a structure of a conventional input device implemented as a switch. FIG. 4B is a view schematically illustrating a structure of a touch input device according to an exemplary embodiment. Referring to FIG. 4A, an input device 200 generally includes a structure 410, a switch 210 configured to output on/off signals based on pressure, and a cover 220. Particularly, the structure 410 may also be referred to as a base, and hereinafter the base will be used for descriptive convenience.

The switch 210 is mounted on the top surface of the base 410. Since the base 410 and the switch 210 are connected via wires, an output signal of the switch 210 may be transferred via the base 410. Additionally, the cover 220 may be mounted on the top surface of the switch 210 using plastic, or the like. The cover 220 may show various information. For example, symbols, numbers, text, and the like may be used to indicate types of received control commands and various buttons may be shown on the surface of the cover 230.

Meanwhile, since the touch input device 110, as shown in FIG. 4B according to an exemplary embodiment provides a function notifying service, the aforementioned symbols, numbers, text, and the like may not be shown on the surface of the cover 230. Thus, the touch input device 110 may increase convenience of the user and diversity of designs. This will be described later. The input device 200 may be implemented by mounting a mechanical part on the base 410 as described above. Accordingly, a weight of the input device 200 increases with increased manufacturing costs. Besides, since the shape of the input device 200 is limited, diversity of design may decrease.

Recently, a method of sensing a touch input of the user via a conductive film, such as an indium tin oxide (ITO) film or a metal mesh film, adhered to a base has been used. However, when the surface of the base to which the conductive film is adhered is not flat, wires disposed in the conductive film may break as the conductive film may be bent or resistance may increase to decrease sensitivity to the touch input. In addition, since an adhesive used to stick the conductive film to the structure is vulnerable to vibration, moisture, temperature, and the like, it is difficult to apply the adhesive to the apparatus mounted within the vehicle 1 requiring durability.

In the touch input device 110 according to an exemplary embodiment, an electrode configured to sense a touch input of the user may be formed directly on an injection object. For example, in the touch input device 110 according to an exemplary embodiment, an electrode pattern 430 configured to sense a touch input of the user may be formed on the base 410 by creating an electrode on an injection object. In addition, the electrode pattern 430 may be connected to a circuit board 460, in which circuits to execute the overall operation of the touch input device 110 is integrated, via a wiring unit 403. Thus, the touch input device 110 according to an exemplary embodiment may be configured to sense the touch input of the user although a mechanical part such as a switch or a conductive film is not adhered thereto.

There are various techniques for creating an electrode pattern 430. For example, the technique of creating an electrode pattern 430 may include laser directing structure (LDS) technique. In particular, the LDS technique may refer to a technique of creating an electrode pattern by forming pattern grooves on a structure such as the base 410 by emitting laser beams thereto, forming metal seeds in the pattern grooves using generated heat generated, and inserting a conductive material thereto. Thus, the touch input device 110 may be configured to recognize a touch of the user by sensing a change in capacitance caused by the touch of the user using a created electrode pattern, which will be described later. In the following description, the LDS technique will be described as an example of the technique of creating an electrode, however, exemplary embodiments of the present disclosure are not limited to the LDS technique.

Meanwhile, the circuit board 460 may be joined to the wiring unit 403 by various methods. For example, the circuit board 460 may be joined to the wiring unit 403 by soldering, without being limited thereto. The joining of the wiring unit 403 and the circuit board 460 of the touch input device 110 is not limited to physical joining methods. For example, the circuit board 460 may have a connection point, and the connection point and the electrode pattern 430 may be spaced apart from each other at a predetermined distance.

The connection point may be formed of a conductive material and may operate as an electrode when current flows therein. Accordingly, the circuit board 460 may be configured to sense capacitance changing in the electrode pattern 430 via the connection point and sense a touch input based thereon. In other words, the circuit board 460 may be configured to sense the touch input by sensing a change in capacitance via the electrode pattern 430 through the connection point although the circuit board 460 is not physically joined to the electrode pattern 430. For example, when capacitance changes in accordance with a change in current flowing in the electrode pattern according to the touch input of the user, inductive power may be generated in the connection point of the circuit board 460. Thus, the circuit board 460 of the touch input device 110 is not implemented by only physical joining or coupling between the circuit board 460 and the wiring unit 403.

Meanwhile, the touch input may include various touch input patterns. For example, the touch input patterns may include various touch gestures such as an action of touching a touch area of the touch input device 110 at least once within a predetermined time period and dragging along an area after touching, without being limited thereto. Hereinafter, the inner structure of the touch input device 110 will be described in more detail.

FIG. 5 is a cross-sectional view schematically illustrating the touch input device according to an exemplary embodiment. The touch input device 110 may include the base 410. The base 410 of the touch input device 110 may include a first base 411 and a second base 415 stacked thereon. The first base 411 and the second base 415 may be implemented by injection molding. For example, the first and second bases 411 and 415 may be formed by injection-molding a metal complex or by injection-molding different materials (e.g., plastic or glass) and coating a metal complex thereon, respectively. In particular, the second base 415 may be coated on the first base 411.

Furthermore, the base 410 according to an exemplary embodiment may have various shapes. For example, one surface of the first base 411 and the second base 415 may be curved, but the shapes thereof are not limited. Accordingly, the shape of the touch input device 110 is not limited and diversity of design may increase. In addition, a pattern groove 420 may be formed on the base 410 by emitting laser beams thereto. According to an exemplary embodiment, the pattern groove 420 may be formed by emitting laser beams, such as ultraviolet (UV) rays or Excimer laser, to one surface of the base 410. In particular, heat generated while the groove is formed reduces the metal complex to metal via decomposition of chemical bonds of the metal complex and forms a metal seed in the pattern groove 420.

The pattern groove 420 may include a first pattern groove 421 formed on one surface (e.g., a first surface) of the first base 411 and a second pattern groove 425 formed on one surface (e.g., a first surface) of the second base 415 as illustrated in FIG. 5. The first pattern groove 421 may be formed to correspond to the shape of the first surface of the first base 411. In particular, since the first pattern groove 421 may be formed by emitting laser beams to correspond to the shape of the first base 411, the first pattern groove 421 may have a curved shape when the first surface of the first base 411 has a curved shape, without being limited thereto.

Since a current pattern used sense an input tool of the user is formed by inserting a conductive material into the first pattern groove 421, which will be described later, and the first pattern groove 421 is formed to correspond to the shape of the first base 411, the shape of the first base 411 is not limited. Thus, the shape of the touch input device 110 according to an exemplary embodiment is not limited. Meanwhile, the electrode pattern may be formed by inserting the conductive material into the pattern groove 420 by a plating process. Accordingly, the electrode pattern provides a path of current to sense a change in capacitance in accordance with the input tool of the user.

Referring to FIG. 5, a first electrode pattern 431 may be formed in the first pattern groove 421 and a second electrode pattern 435 may be formed in the second pattern groove 425 by a plating process. In other words, the first and second electrode patterns 431 and 435 may be formed in the first and second pattern grooves 421 and 425 by plating. The plating process on the metal seed may be any plating technique commonly used in the art, and thus detailed descriptions thereof will be omitted.

In other words, a plurality of electrode patterns may be disposed to be spaced apart from each other. Each electrode pattern 430 may be connected, via the wiring unit, to a circuit board in which constituent elements to execute the overall operation of the touch input device 110 are integrated. Thus, as illustrated in FIG. 5, the electrode pattern 430 is not limited to that including the first electrode pattern 431 and the second electrode pattern 435. The electrode pattern 430 may include more electrode patterns. The touch input device 110 may be configured to sense an area of a touch input based on capacitance changing in accordance with the touch input of the user on the electrode pattern 430. Hereinafter, an area provided in the electrode pattern 430 and capable of sensing a touch of the user will be referred to as a touch area.

Furthermore, the user may touch the touch area of the touch input device 110 of the vehicle 1 intentionally for a touch input or unintentionally. In other words, all touch actions may not be intended to operate the apparatuses mounted within the vehicle 1. The touch input device 110 may be configured to receive an intentional or unintentional touch. In particular, when the touch input device 110 operates the apparatuses mounted within the vehicle 1 in accordance with all touch actions, the user may experience inconvenience, particularly, threaten safety of the user while driving.

Thus, the touch input device 110 may be configured to determine whether the change in capacitance is greater than a predetermined threshold value and determine whether the user touch is intended for a touch input, i.e., intention of the user, based on the result of determination. In particular, the predetermined threshold value, which is a change in the capacitance value that allows the touch input device 110 to determine the intended touch, may be preset and stored in a memory (not shown) of the vehicle 1.

Additionally, the coating layer 450 may be formed on the second base 415 to protect the second electrode pattern 435 from external impact or contaminants. As a result, the coating layer 450 may constitute a touch surface of the touch area. The touch input device 110 may be configured to sense a touch position of the input tool by detecting changes in capacitance of the first and second electrode patterns 431 and 435 when the input tools contacts the touch area.

FIG. 6 is a view illustrating an electrode pattern provided on the surface of a touch input device according to an exemplary embodiment, more particularly, a structure diagram illustrating an alignment of electrodes of the touch input device 110 according to an exemplary embodiment. Although different from an actual structure, FIG. 6 is a plan view illustrating operation of the touch input device 110. The touch input device 110 may include a touch area 401 which the input tool of the user contacts, the first and second electrode patterns 431 and 435 integrally formed with the touch area 401 or disposed under the touch area 401, and the wiring unit 403 and a connection pad 404 connected thereto.

When a finger of the user, a touch pen, or the like contacts the touch area 401, the first electrode pattern 431 and the second electrode pattern 435 may sense changes in capacitance to create a predetermined pattern to sense a position of the contact. In particular, the contact (touch) may include both a direct contact and an indirect contact. For example, the direct contact refers to when an object is in contact with the touch input device 110, and the indirect contact refers to when the object is not in contact with the touch input device 110 but located adjacent to the touch input device 110 within a range detectable by the electrode pattern.

For example, the first electrode pattern 431 may be formed in a first direction (e.g., horizontal direction in the drawing), and a plurality of first electrode patterns 431 may be arranged to be spaced apart from each other at predetermined intervals. The second electrode pattern 435 may be formed in a direction different from the first direction (e.g., vertical direction in the drawing), and a plurality of second electrode patterns 435 may be arranged to be spaced apart from each other at predetermined intervals. The first electrode pattern 431 and the second electrode pattern 435 may be disposed in different layers and form junctions C. At a junction C, the first electrode pattern 431 and the second electrode pattern 435 may overlap each other with an insulator interposed therebetween.

Meanwhile, the junctions C may determine a resolution of the touch area 401 or may be recognized as coordinates. In other words, when the input tool contacts one junction C may be distinguished from when the input tool contacts another junction C adjacent to the one junction C. A junction C in contact with the input tool may be detected. Thus, as the number of the junctions C increases in the same area, the resolution of the touch area 401 may increase.

One end (e.g., a first end) of each of the first and second electrode patterns 431 and 435 may be connected to the wiring unit 403 including metal wires. One end of the wiring unit 403 may include the connection pad 404, and each wiring unit 403 may be connected to the circuit board 460

(FIG. 4B) via the connection pad 404. One end (e.g., a second end) of each of the first and second electrode patterns 431 and 435 may include an connection unit 402. Since the connection unit 402 has a greater width than each of the first and second electrode patterns 431 and 435, the wiring unit 403 may be connected to the first and second electrode patterns 431 and 435 more efficiently. The connection unit 402 and the wiring unit 403 may be adhered to each other by a conductive adhesive (e.g., solder).

The wiring unit 403 may be configured to transfer a sensing signal of the electrode pattern to the circuit board 460 via the connection pad 404. The wiring unit 403 and the connection pad 404 may be formed of conductive materials. When the input tool contacts a region of the touch area 401, capacitance of the junction C decreases. Information regarding the capacitance may be transmitted to the circuit board 460 (FIG. 4B), which executes the overall operation of the touch input device 110, via the wiring unit 403 and the connection pad 404. Thus, the touch input device 110 may be configured to determine the contact position of the input tool. Alternatively, capacitance may decrease when the input tool is located adjacent to a region of the touch area 401. Accordingly, the touch input device 110 may be configured to determine the position to which the input tool is adjacent.

Meanwhile, the first electrode pattern 431 and the second electrode pattern 435 are not limited to those illustrated in FIG. 6. The electrode pattern may be designed to correspond to the shape of one surface of the base. Accordingly, since the electrode pattern may be inserted by the LDS technique regardless of the shape of the base, the touch input device 110 according to an exemplary embodiment may have various shapes without design limitation. In addition, since the touch input device 110 according to an exemplary embodiment does not require a mechanical part such as a switch or a button, manufacturing costs and weights thereof may be reduced.

Furthermore, since the electrode pattern of the touch input device 110 according to an exemplary embodiment is formed via laser processing directly applied to the structure instead of additionally adhering a conductive material thereto, durability may be maintained regardless of temperature and humidity within the vehicle 1. The touch input device 110 according to an exemplary embodiment may have improved durability under particular conditions where the vehicle 1 vibrates while driving since the conductive material is not adhered thereto. Additionally, since an additional material such as the conductive material is not adhered thereto (e.g., is omitted), weight may be reduced and costs for adhering the conductive material are not required.

Figure 7A:
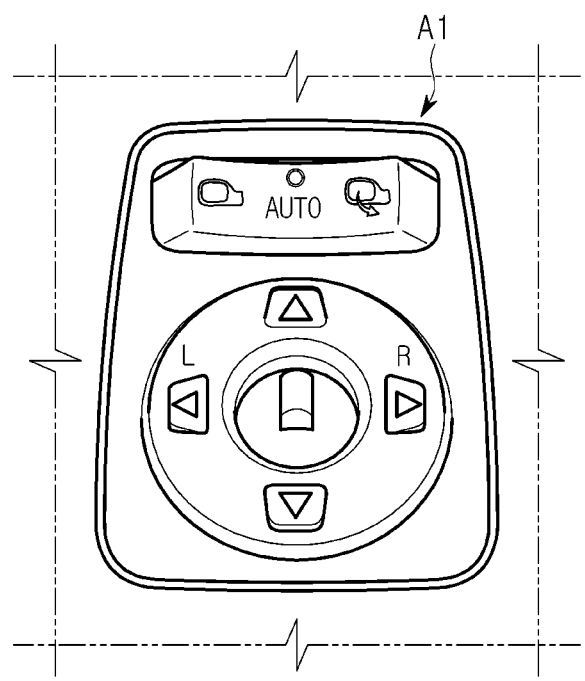
FIGS. 7A-7B are views illustrating a first input device to receive a control command regarding a position of a side mirror and a first touch input device replacing the first input device according to an exemplary embodiment of the present disclosure.
Figure 7B:
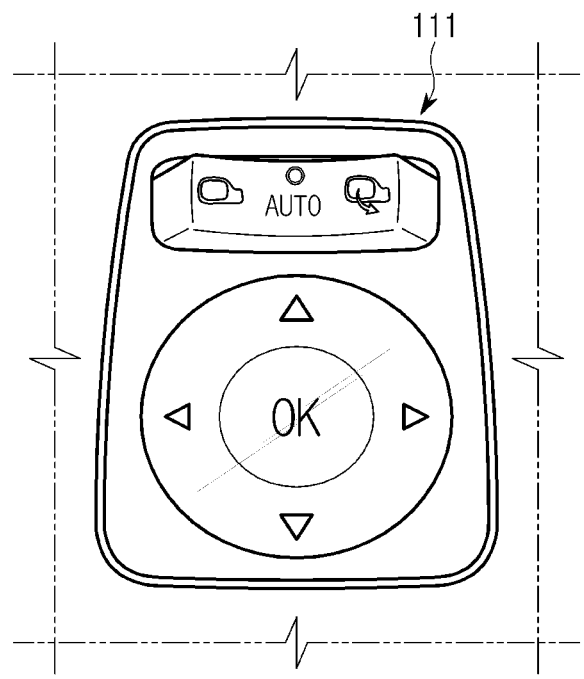

Hereinafter, the first touch input device 111, the second touch input device 112, and the third touch input device 113 will be described as examples of the touch input device 110 for descriptive convenience. However, input devices configured to receive various control commands from the user may be implemented according to exemplary embodiments of the present disclosure without limitation. FIG. 7A is a view illustrating a first input device configured to receive a control command regarding a position of a side mirror. FIG. 7B is a view illustrating a first touch input device replacing the first input device illustrated in FIG. 7A.

Referring to FIG. 7A, a first input device A1 may include four switches configured to receive control commands in upward, downward, leftward, and rightward directions. Thus, the user may control the position of a side mirror by applying a pressure to one of the switches constituting the first input device A1. In this regard, the first input device A1 may have a large volume due to the switches and a cover to enclose the switches.

The first touch input device 111 according to an exemplary embodiment may fabricated by inserting the electrode pattern into the base and forming the coating layer on the base via a coating process, and thus a volume thereof may be reduced and a smooth design may be obtained as illustrated in FIG. 7B. Meanwhile, directions to adjust the side mirror may be indicated using arrow marks in each touch area of the coating layer as illustrated in FIG. 7B. For the first input device A1, the user may adjust rotation of the side mirror in one direction by applying pressure to one of the four switches, and the side mirror is not capable of being adjusted in two directions.

For example, when the user desires to adjust the side mirror in one of the upward and downward directions and one of the leftward and rightward directions, the user may sequentially apply pressure to two switches corresponding thereto. Additionally, when the side mirror is adjusted in two directions, the adjustment degree of the side mirror in one of the upward and downward directions and the adjustment degree of the side mirror in one of the leftward and rightward directions is unable to be set simultaneously using switches simply outputting on/off signals. In other words, the first input device A1 is unable simultaneously receive manipulation commands for two direction, and the switch needs to be pressed until the control to a desired position is terminated to then enter the next direction. Thus, the user may experience inconvenience in manipulation.

Figure 8A:
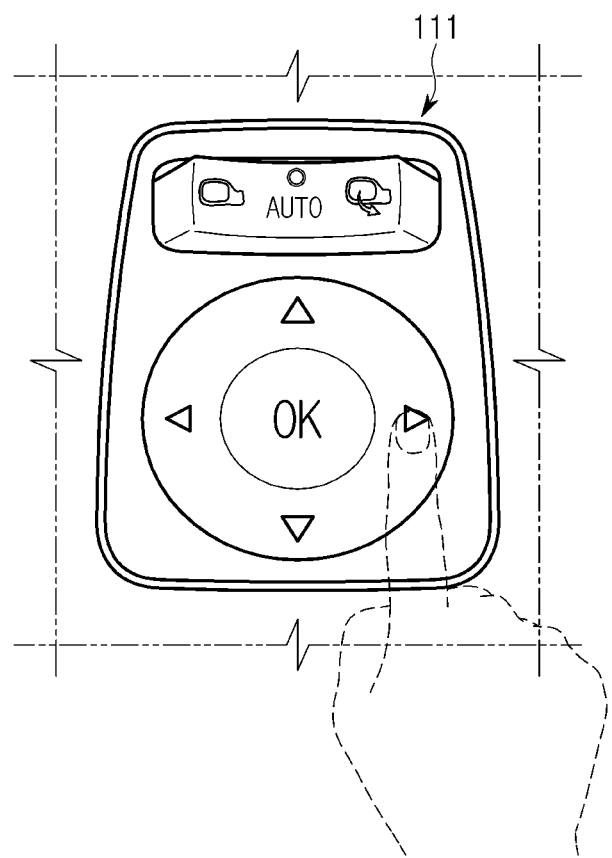
FIGS. 8A-8B are views illustrating the first touch input device to receive a control command according to an exemplary embodiment of the present disclosure.

On the contrary, the user may input control commands by a simple touch input by using the first touch input device 111 according to an exemplary embodiment without applying pressure thereto, and the side mirror may be adjusted in two directions simultaneously. For example, the first touch input device 111 may be configured to sense various touch input patterns of the user and detect control commands of the user based thereon. When the user touches a particular region of the touch area, the first touch input device 111 may be configured to sense the touch input of the user and detect a control command based on a sensing result as illustrated in FIG. 8A.

Figure 8B:
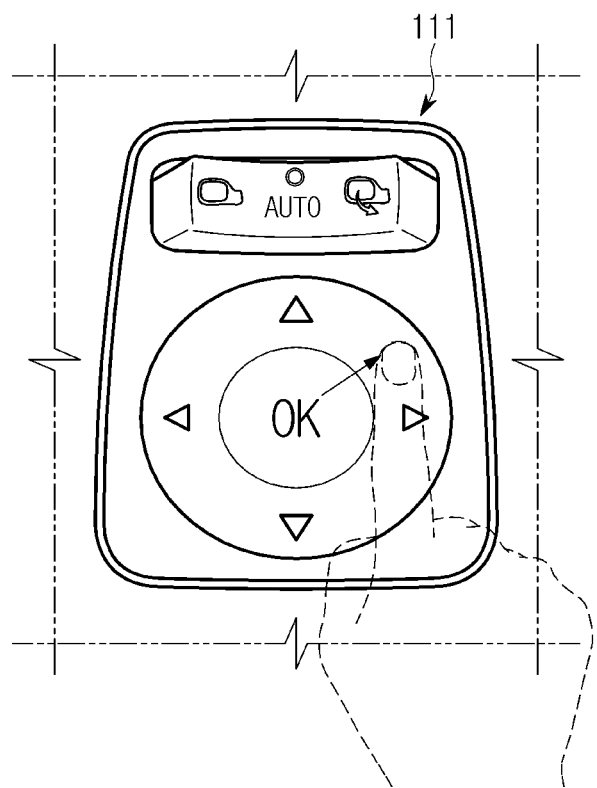

As another example, when the user drags a finger in one direction after touching, the first touch input device 111 may be configured to determine the direction of the side mirror among the upward, downward, leftward, and rightward directions based on the dragging direction as illustrated in FIG. 8B. In addition, the first touch input device 111 may be configured to determine the degree of rotation of the side mirror, i.e., the adjusting degree of the side mirror, by sensing a length of dragging. Accordingly, the controller 120 may be configured to adjust the side mirror in two direction simultaneously based on the sensing result. In other words, the user may set the adjusting direction of the side mirror in more detail via a simplified touch input.

Figure 9A:
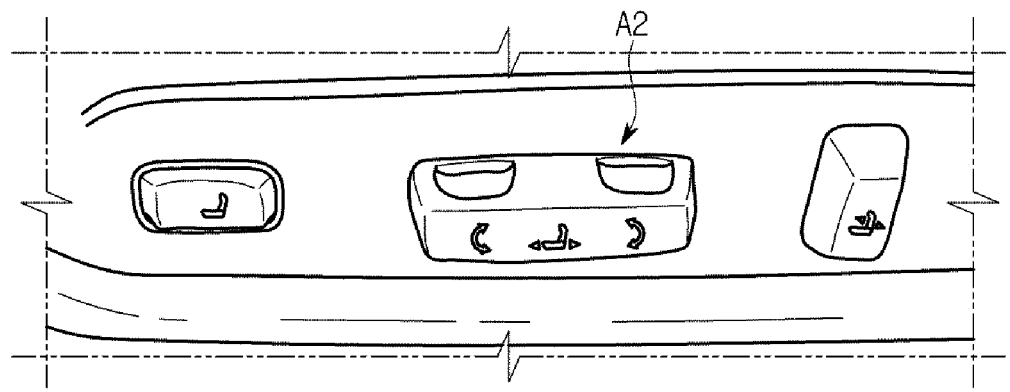
FIGS. 9A-9B are views illustrating a second input device to receive a control command regarding a position of an electromotive seat and a second touch input device to receive a control command regarding a position of the electromotive seat according to an exemplary embodiment of the present disclosure.
Figure 9B:
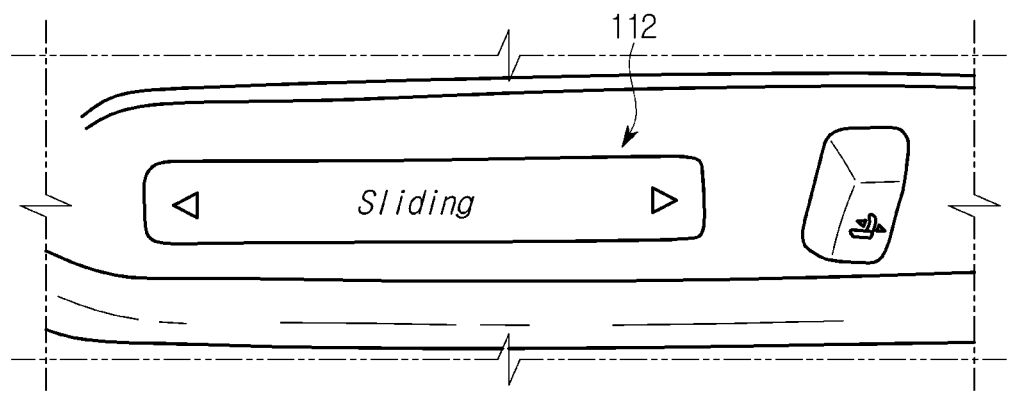

Moreover, FIG. 9A is a view illustrating a second input device configured to receive a control command regarding a position of an electromotive seat. FIG. 9B is a view illustrating a second touch input device configured to receive a control command regarding a position of the electromotive seat. Referring to FIG. 9A, the user may adjust the position of the electromotive seat via a second input device A2 disposed at one side of the electromotive seat and including buttons. In particular, a switch and a cover, which are mounted on a base of the second input device A2, protrude from the surface of the electromotive seat resulting in marring of the external appearance thereof as illustrated in FIG. 9A. On the contrary, a second touch input device 112 according to an exemplary embodiment may have a reduced occupying area by forming an electrode pattern and a coating layer on the base without mounting an additional mechanical part on the base as illustrated in FIG. 9B.

Figure 10A:
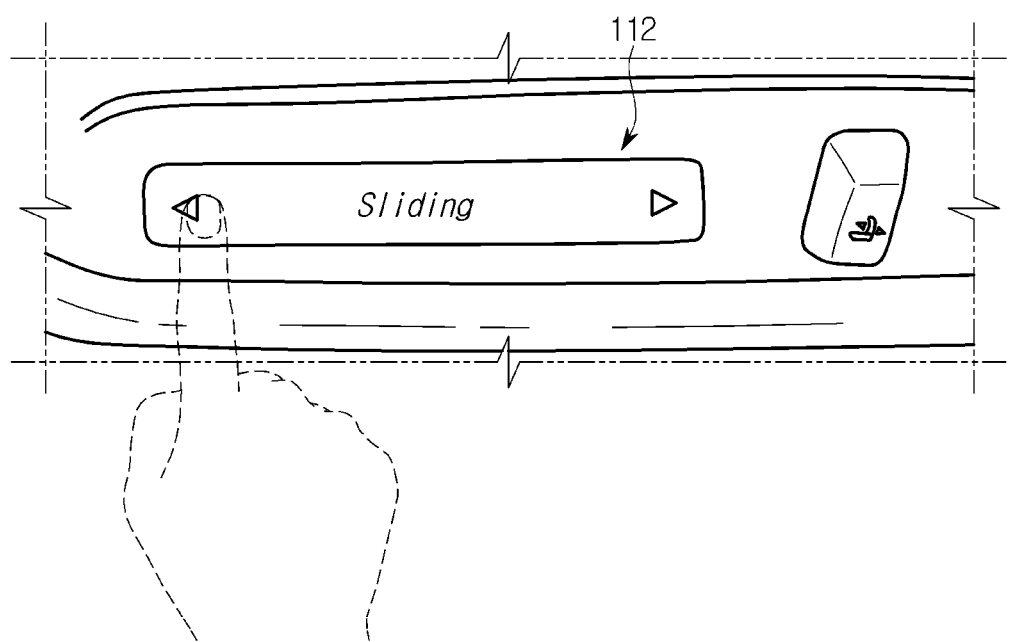
FIGS. 10A-10B are views illustrating the second touch input device to receive a control command according to an exemplary embodiment of the present disclosure.

Additionally, the user is required to maintain pressure on a switch mounted on the second input device A2 until the electromotive seat reaches a desired position to adjust the electromotive seat to the desired position. On the contrary, for the second touch input device 112, the user may conveniently touch a particular region of the touch area until the electromotive seat reaches a desired position as illustrated in FIG. 10A. In addition, the second touch input device 112 may be configured to detect a desired degree of adjusting the electromotive seat by the user based on an intensity of touch sensed at the touch area corresponding to a desired direction to move. In particular, since the user inputs the adjustment degree of the electromotive seat by adjusting the intensity of touch, it is more convenient than pressing the switch.

Figure 10B:
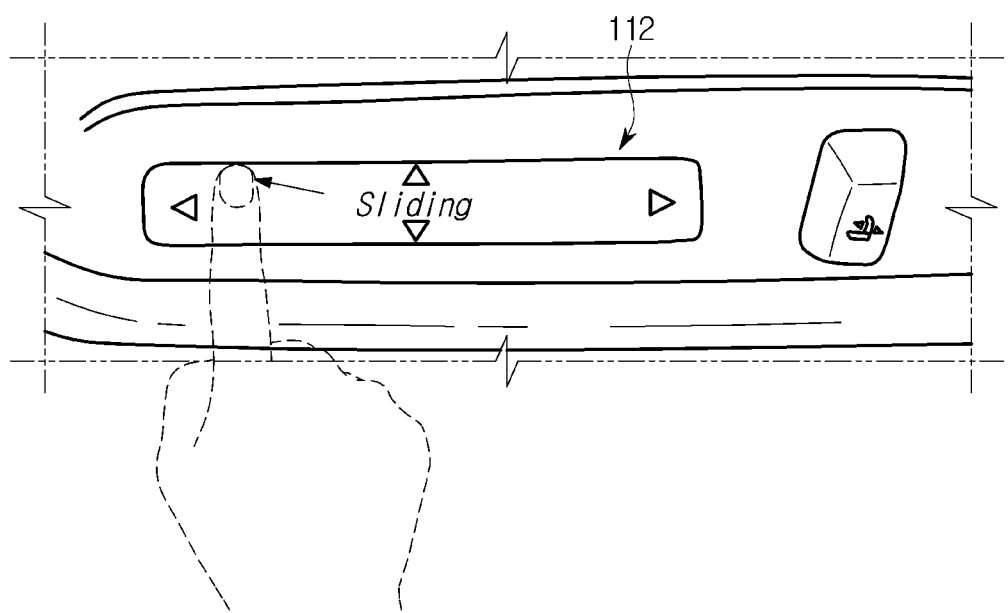

As another example, when the user drags a finger in a diagonal direction after touching the touch area, the second touch input device 112 may be configured to receive a control command that corresponds thereto as illustrated in FIG. 10B. Particularly, the second touch input device 112 may be configured to recognize a control command regarding the adjustment degree of height and depth of the electromotive seat based on the direction and length of dragging the input tool of the user. Then, the controller 120 according to an exemplary embodiment may be configured to generate a control signal that corresponds to the control command and adjust the height and depth of the electromotive seat simultaneously.

Since the user is required to separately input commands to adjust the height and depth of the electromotive seat to the second input unit A2, two inputs are required. However, the user may simultaneously input the control commands regarding various positions such as the height and depth of the electromotive seat by using the second touch input device 112 according to an exemplary embodiment. The conventional input devices mounted within the vehicle may be replaced by the touch input device as described above.

Figure 11A:
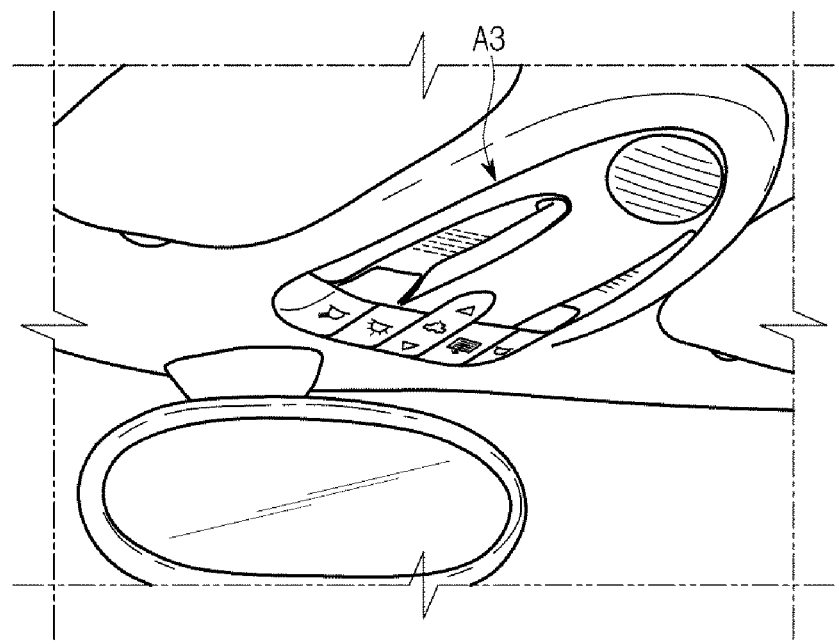
FIGS. 11A-11B are views illustrating a third input device including a button to receive a control command regarding a sunroof and a third touch input device to receive a control command regarding the sunroof according to an exemplary embodiment of the present disclosure.
Figure 11B:
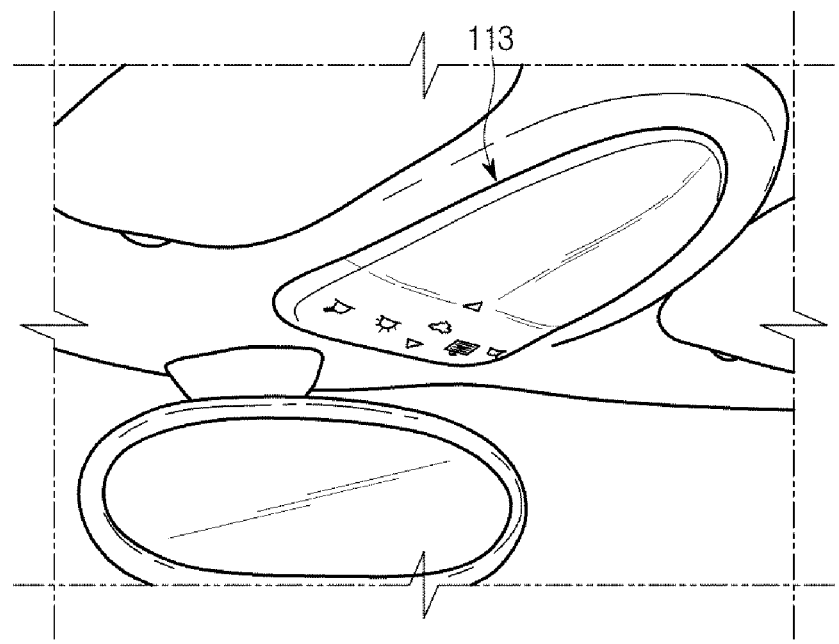

For example, FIG. 11A is a view illustrating a third input device including a button configured to receive a control command regarding a sunroof. FIG. 11B is a view illustrating a third touch input device configured to receive a control command regarding the sunroof. Referring to FIG. 11A, the user may input a command to open and close the sunroof and the degree of opening and closing the sunroof by pressing a button provided in a third input device A3. However, the user is required to maintain pressure on the button until a desired degree of opening and closing the sunroof is obtained. A third touch input device 113 according to an exemplary embodiment may be configured to recognize a control command of the user by sensing a touch input of the user as illustrated in FIG. 11B. For example, when the user touches a particular region of the touch area, the third touch input device 113 may be configured to recognize the position of the region touched by the user and recognize a user intention between opening and closing of the sunroof.

Figure 12A:
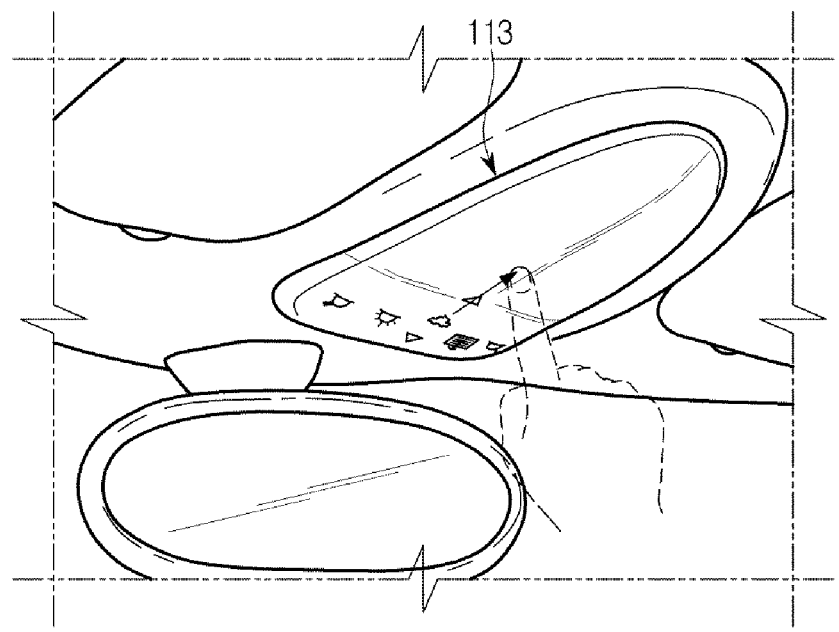
FIGS. 12A-12B are views illustrating the third touch input device to receive a control command according to an exemplary embodiment of the present disclosure.
Figure 12B:
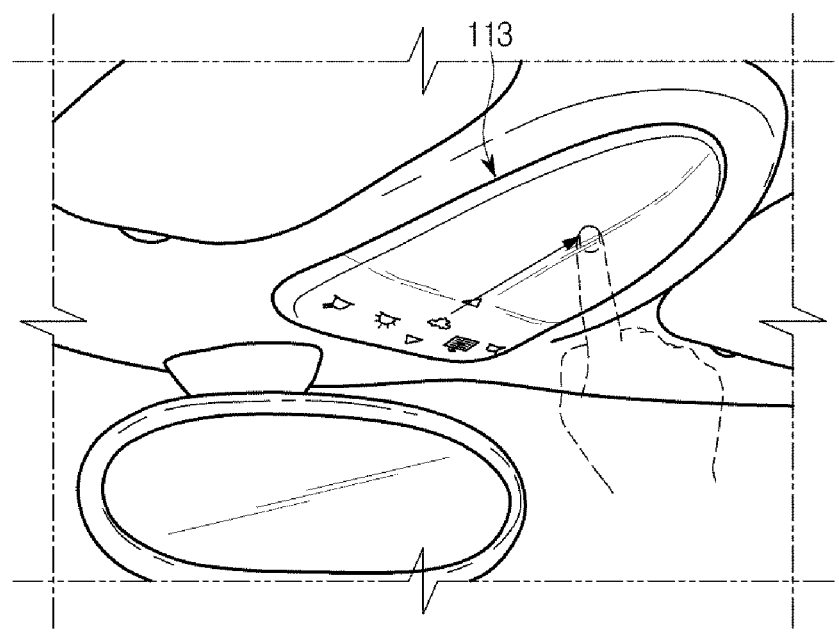

As another example, when the user drags a finger after touching, the third touch input device 113 may be configured to recognize a control command by sensing the direction and degree of dragging. For example, referring to FIGS. 12A and 12B, when the user drags the finger in a direction opposite to the front window after touching, the third touch input device 113 may be configured to recognize that the user inputs a command to open the sunroof. In addition, the third touch input device 113 may be configured to sense the degree of dragging and recognize the degree of opening of the sunroof based on the sensing result. Thus, the controller 120 may be configured to open the sunroof further when a touch input of the user illustrated in FIG. 12B is sensed than when a touch input of the user illustrated in FIG. 12A is sensed. In other words, different user inputs may be interpreted as different opening degrees. Meanwhile, implementation of the touch input device is not limited to those described above.

Figure 13A:
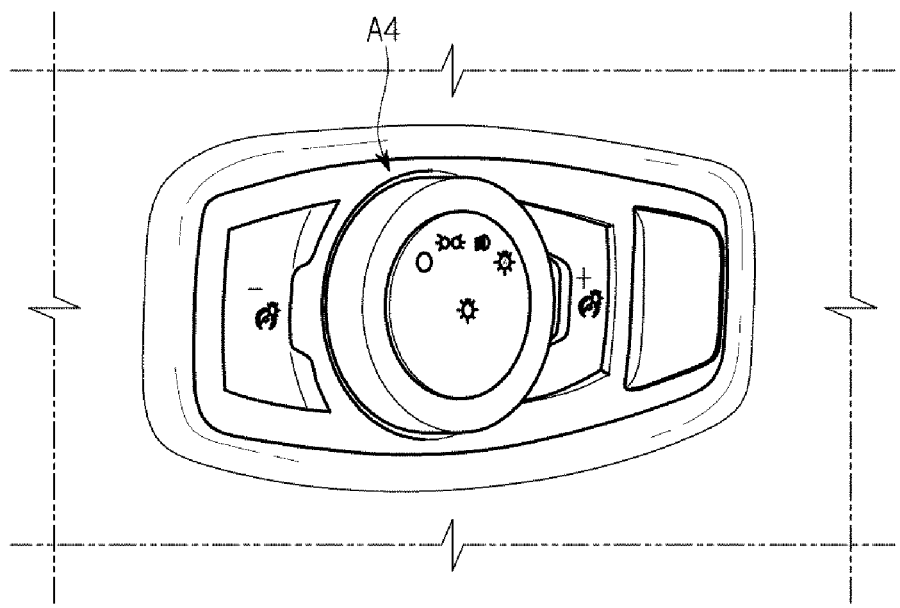
FIGS. 13A-13B are views illustrating a fourth input device to receive a control command regarding a head lamp via a switch and a fourth touch input device to receive a control command regarding the head lamp as an example of the touch input device according to an exemplary embodiment of the present disclosure.
Figure 13B:
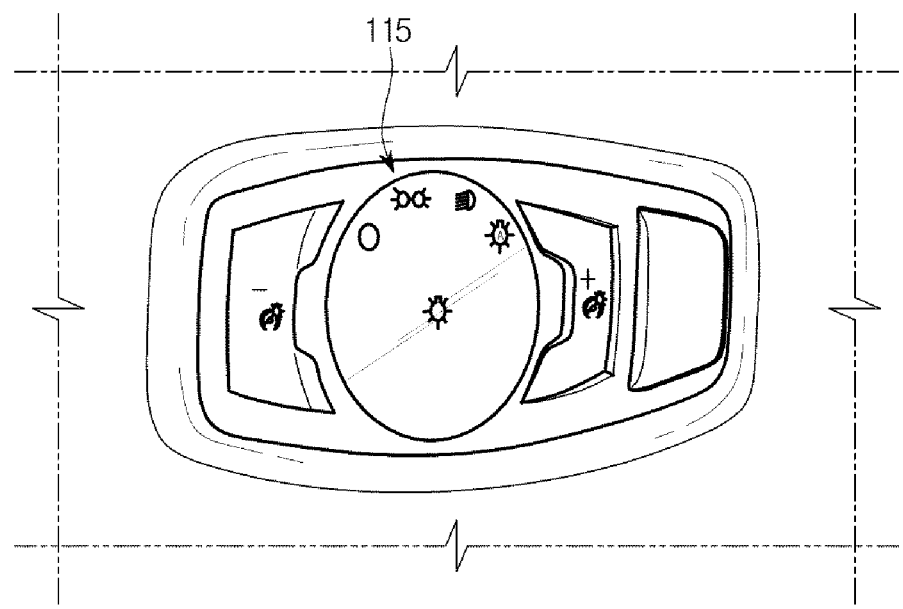
Figure 14A:
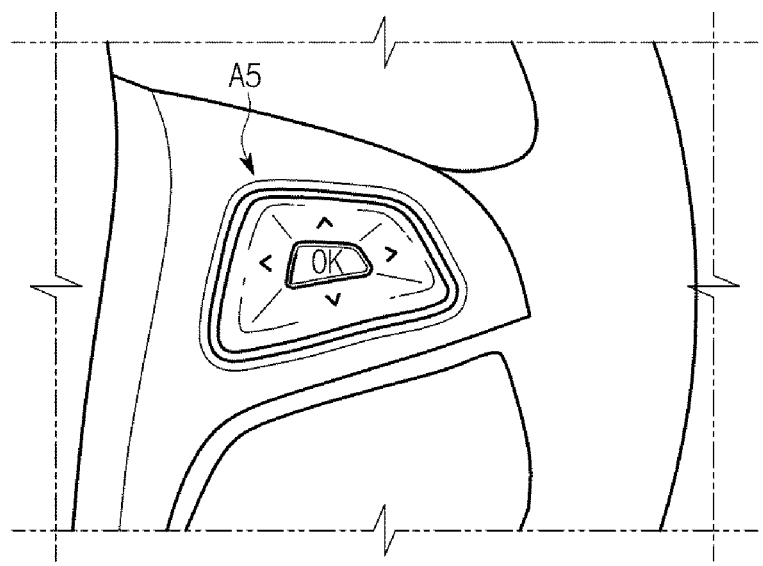
FIGS. 14A-14B are views illustrating a fifth input device to receive a control command regarding volume control via a switch and a fifth touch input device to receive a control command regarding the volume control as an example of the touch input device according to an exemplary embodiment of the present disclosure.
Figure 14B:
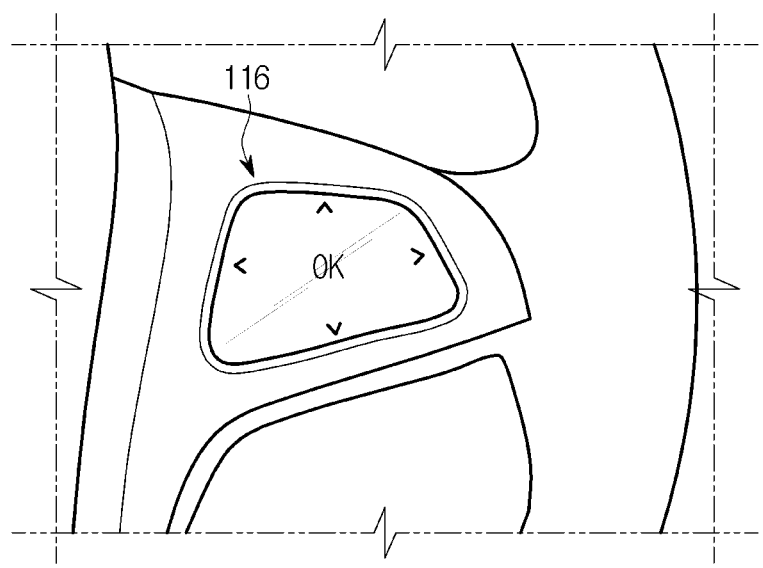

FIG. 13 is a view illustrating a fourth input device configured to receive a control command regarding a head lamp via a switch and a fourth touch input device configured to receive a control command regarding the head lamp as an example of the touch input device. FIG. 14 is a view illustrating a fifth input device configured to receive a control command regarding volume control via a switch and a fifth touch input device configured to receive a control command regarding the volume control as an example of the touch input device.

Referring to FIG. 13, a fourth input device A4 may be configured to receive a control command regarding the head lamp via a switch may be replaced by a fourth touch input device 115 fabricated by the LDS technique and including a touch area formed on a base. Additionally, referring to FIG. 14, a fifth input device A5 configured to receive a control command regarding the volume control via a switch may be replaced by a fifth touch input device 116 fabricated by the LDS technique and including a touch area formed on a base.

Recently, since vehicles are equipped with various apparatuses, making the vehicles more complex, it may be difficult for the user to recognize the particular apparatuses mounted within the vehicles. Thus, the user may not efficiently utilize all the apparatuses. In addition, the user is required to divert attention from the road to input a control command via an input device within the vehicles, and thus driving safety may be threatened.

The touch input device 110 according to an exemplary embodiment of the present disclosure may provide a function notifying service to improve driving safety. For example, when the user touches the touch input device 110, the controller 120 may be configured to receive information regarding a touch input from the touch input device and output a speech providing a notification of functions of the touch input device by operating the speaker 143 via a control signal, thereby assisting safe driving of the user. Alternatively, the controller 120 may be configured to display functions of the touch input device touched by the user on a head-up display (HUD) via a control signal.

In particular, the touch input device 110 may be configured to determine whether a touch of the user is intended to detect functions of the touch input device 110 in accordance with a predetermined gesture of the user. For example, when the user touches a particular portion or point for over a predetermined time period, the touch input device 110 may be configured to determine that the user requests explanations regarding functions of the touch input device 110 via a speech. Meanwhile, this will be described later in more detail.

Referring to FIGS. 13 and 14, the fourth and fifth touch input devices 115 and 116 according to an exemplary embodiment may provide a simplified design, i.e., seamless design, compared with the fourth and fifth input devices A4 and A5. Further, the vehicle 1 may include the controller 120. The controller 120 may be implemented using a processor such as a micro control unit (MCU) and a memory. The memory may be configured to store data in the form of control algorithms or programs about operation of the apparatuses mounted within the vehicle 1. Thus, the controller 120 may be configured to execute operation of the apparatuses by using data stored in the memory. The processor and the memory may be configured as separate chips or a single chip, without being limited thereto. The controller 120 may be included in the AVN terminal 100 or may be separated therefrom, without being limited thereto.

Furthermore, controller 120 may be configured to generate a control signal and operate constituent elements of the vehicle 1 via the generated control signal. For example, the controller 120 may be configured to generate a control signal based on a control command in accordance with a touch input sensed by the touch input device 110 and execute the operation of the apparatuses mounted within the vehicle 1. The controller 120 may further be configured to generate a control signal based on the result sensed by the touch input device 110 and operate the apparatuses mounted within the vehicle 1 to correspond to the sensing result. For example, when the particular region of the touch area is sensed in the first touch input device 111, the controller 120 may be configured to adjust the side mirror in a direction corresponding to the particular region via the control signal (e.g., the horizontal direction in the drawing) as illustrated in FIG. 8A.

As another example, when the touch on the particular region corresponding to the aforementioned direction is maintained, the controller 120 may be configured to operate a motor of the side mirror for a maintaining time period to adjust the side mirror in the direction corresponding to the particular region (e.g., the horizontal direction in the drawing). In other words, when the first touch input device 111 senses the position of the touch input of the user and time period during which the touch input is maintained, the controller 120 may be configured to adjust the side mirror to correspond to the sensing result via the control signal upon receiving the sensing result.

Referring to FIG. 8B, when the user drags a finger in a diagonal direction after touching, the first touch input device 111 may be configured to sense the dragging touch. Then, the controller 120 may be configured to rotate the side mirror in the diagonal direction. In particular, the rotation degree of the side mirror may be adjusted in accordance with a length of dragging input by the user. In other words, the controller 120 may be configured to adjust the side mirror by generating the control signal based on the sensing result. Thus, the vehicle 1 according to an exemplary embodiment may be configured to adjust the side mirror by a single touch input without separately inputting upward, downward, leftward, and rightward directions.

The touch input device 110 may further be configured to provide a function notifying service to inform a driver of the function of one touch input device selected, by a touch input, from the first to $N^{th}$ touch input devices 111, 112, 113, and 114. Hereinafter, operation of providing the function notifying service will be described.

Figure 15:
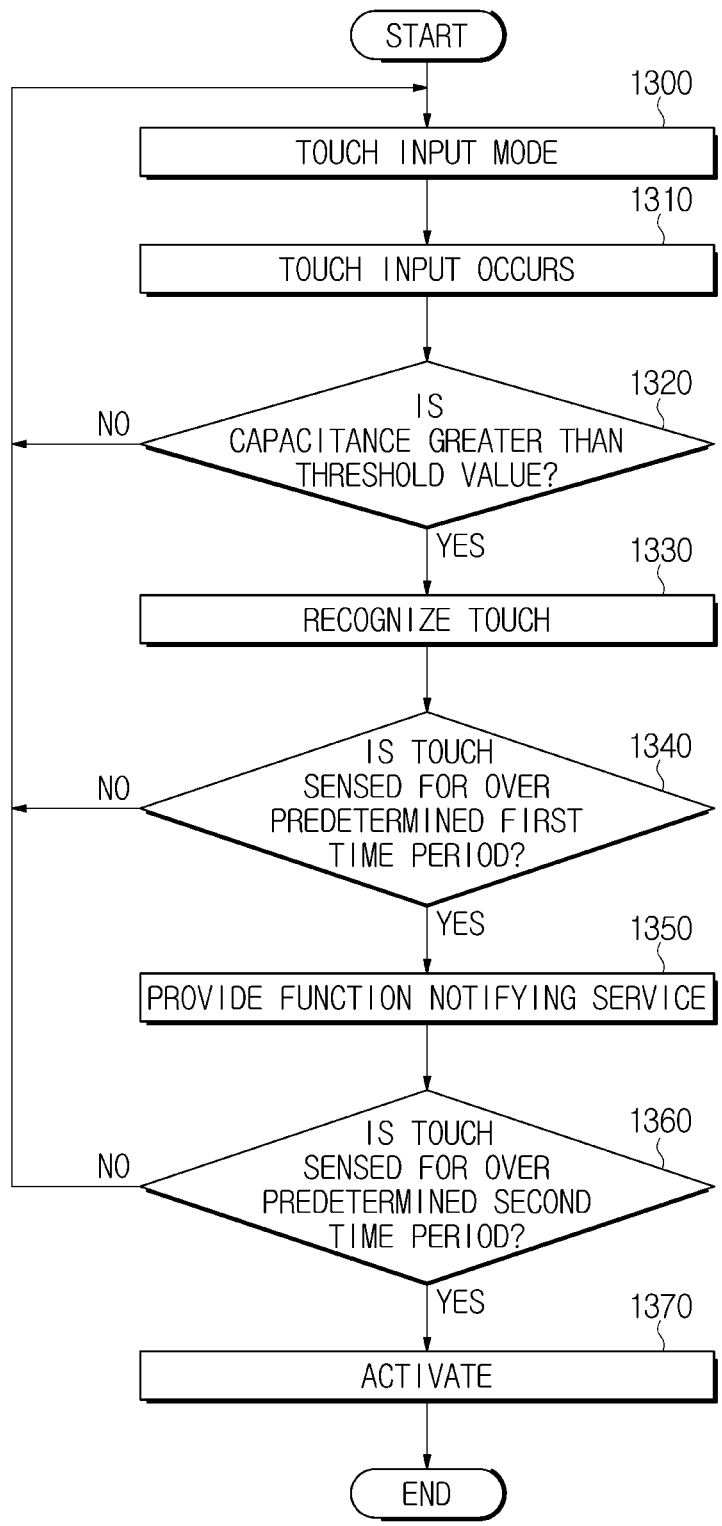
FIG. 15 is a flowchart illustrating operation of a vehicle according to an embodiment providing a function notifying service in accordance with a touch input according to an exemplary embodiment of the present disclosure.

FIG. 15 is a flowchart illustrating operation of a vehicle according to an exemplary embodiment providing a function notifying service in accordance with a touch input. The method described herein below may be executed by a controller having a processor and a memory and mounted within the vehicle. Referring to FIG. 15, a vehicle may be provided with a touch input device in which a touch input mode is activated (1300). In particular, the touch input mode may be activated constantly or in accordance with a position of an ignition key.

To activate the touch input mode, the touch input device may first be activated. The touch input device may be activated under given power conditions. For example, when the user inserts the ignition key and turns the ignition key to an accessory (ACC) position, the touch input device may be activated. The ACC position is merely an example, and the given power conditions are not limited to the ACC position. In addition, although the touch input device is activated, the user may set a lock mode in which the touch input is not sensed by the touch input device. Thus, activation of the touch input mode may be determined in accordance with the lock mode.

While the touch input mode is activated, the touch input device may be configured to sense occurrence of a touch input on the touch area (1310). In particular, the touch input of the user may or may not be intended for using the touch input device. For example, the user may inadvertently press or engage a button different from a desired button or the user may accidentally press the button while moving. Thus, the touch input device according to an exemplary embodiment may be configured to determine whether a capacitance measured by the electrode pattern is greater than a threshold value (1320). The threshold value may be predetermined. Accordingly, when the measured capacitance is less than the predetermined threshold value, the touch input device may return to the touch input mode (1300).

Alternatively, when the measured capacitance is greater than the predetermined threshold value, the touch input device may be configured to determine that the touch input of the user is intended for using the touch input device and perform operation of recognizing the touch input (1330). In particular, since the touch input device according to an exemplary embodiment is manufactured by laser patterning the structure as described above, an additional material is not required to be adhered thereto. Thus, the touch input device according to an exemplary embodiment may have diverse designs, and symbols, numbers, text, and the like to provide information regarding functions of the touch input device selected by the touch input may not be required.

Since the vehicle 1 is equipped with various apparatuses, it may be difficult for the user to recognize the apparatuses mounted within the vehicle 1. Thus, the user may not efficiently utilize all the apparatuses. The touch input device according to an exemplary embodiment may be configured to determine whether to provide a function notifying service in accordance with a touch sensed at a touch area maintaining for over a predetermined first time period (1340). When a sensing time of the touch input is greater than the predetermined first time period, the touch input device may provide the function notifying service. For example, the user may recognize the function provided by the touch input device via the speaker, the head-up display, or the like, while the user maintains a gaze in the driving direction or maintains a forward view.

Meanwhile, contents provided via the function notifying service may vary based on the touch input device. For example, when a touch is sensed by the third input device 113 (FIG. 3), which receives a manipulation command regarding opening and closing of the sunroof, for over the first time period, the third touch input device 113 (FIG. 3) may be configured to output a speech such as, "button to manipulate sunroof" via the speaker or a pop-up message such as, "button to manipulate sunroof" via the head-up display interoperating with the controller 120 (FIG. 3). As another example, when a touch is sensed by the first touch input device 111 (FIG. 3) for over the first time period, the first touch input device 111 (FIG. 3) may be configured to output a speech or a pop-up message such as "button to manipulate side mirror" via the speaker or the head-up display interoperating with the controller 120 (FIG. 3).

In addition, when a touch input of the user continues after a sensed time period, for example, when a sensing time of the touch input is greater than a predetermined second time period (1360), the touch input device may be configured to determine that the user intends to use the touch input device to which the touch is input and thus may be configured to activate the touch input service. Thus, the touch input device may be configured to recognize the touch input of the user and execute operation of an apparatus of the vehicle based on the recognition result (1370). In particular, the touch input device may be configured to execute the operation of the apparatus interoperating with the controller 120 (FIG. 3), and detailed descriptions thereof will not be given.

Meanwhile, the function notifying service is not always provided. For example, the user may set whether to provide the function notifying service via the display 101 (FIG. 2). Accordingly, the touch input device according to an exemplary embodiment may be configured to determine whether to provide the function notifying service in accordance with a user setting, thereby improving convenience of the user. Thus, the function notifying service is not always provided before performing the touch input service, i.e., a process of recognizing the touch input of the user.

Figure 16:
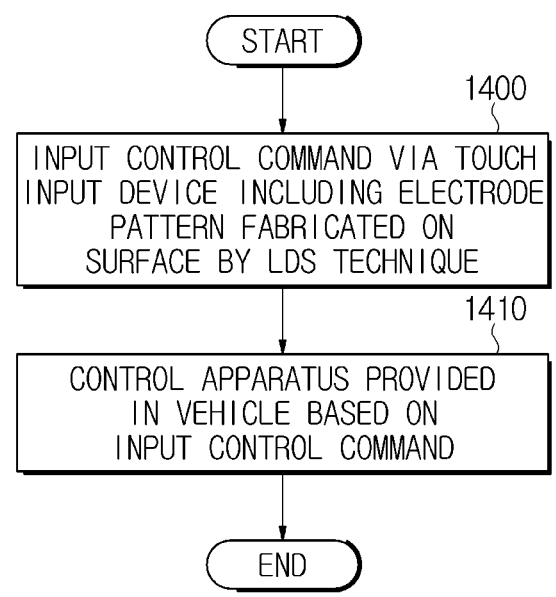
FIG. 16 is a flowchart illustrating operation of a vehicle according to an exemplary embodiment of the present disclosure.

FIG. 16 is a flowchart illustrating operation of a vehicle according to an exemplary embodiment. The method described herein below may be executed by a controller having a processor and a memory and mounted within the vehicle. The vehicle may be configured to sense a touch input of the user via the touch input device and receive a control command based on a sensing result (1400). The touch input device may replace various input devices of the vehicle and may be implemented in various forms. For example, the touch input device may be provided in the vehicle replacing the first input device configured to receive a command to adjust the side mirror, the second input device configured to receive a command to adjust the electromotive seat, and the third input device configured to receive a command to control the sunroof. Alternatively, the touch input device may be mounted within the vehicle instead of the center input unit, the input unit disposed at the steering wheel, the input unit configured to receive a command to operate the head lamps. In other words, the touch input device may replace various conventional input devices that receive various control commands from the user.

An electrode pattern may be formed by emitting laser beams to one surface of a base to form a pattern groove and subjecting the pattern groove to a plating process. When a current flows in the electrode pattern, capacitance may chance in the electrode pattern in accordance with a touch input of the user. Thus, the touch input device may be configured to sense the touch input of the user. In other words, the vehicle may be configured to recognize various manipulation commands of the user via at least one touch input device that senses the touch input of the user based on the electrode pattern mounted on the base and fabricated by the LDS technique.

The vehicle may further be configured to sense the touch input of the user and operate apparatuses of the vehicle in accordance with a control command recognized based on the sensing result (1410). In particular, the vehicle may be configured to sense various touch input patterns, recognize control commands desired by the user based on the sensing results, and operate the apparatuses of the vehicle in accordance with the recognized control commands.

The touch input pattern may include a plurality of touches within a predetermined time period, dragging, and various gestures in addition to a single touch, without being limited thereto. More particularly, the user may perform a plurality of touch inputs, a continuous touch in a given direction, i.e., a dragging input, or a long or short (e.g., varying lengths of time) touch input on the touch area of the touch input device. Alternatively, the user may touch the touch area with a controlled intensity. Then, the vehicle may be configured to sense various types of touch inputs (i.e., gestures) and operate the apparatuses based on the sensing results. In other words, the vehicle according to an exemplary embodiment may be configured to more accurately determine the control command desired to be input by the user by receiving various touch input patterns via the touch input devices, and recognizing the touch input patterns in consideration of characteristics of each apparatus of the vehicle.

For example, one touch input device per one apparatus may be mounted within the vehicle or one touch input device may be configured to receive manipulation commands for a plurality of apparatuses. For example, when the user touches a touch area of the second touch input device, which receives only the manipulation command for the electromotive seat, multiple times for a predetermined time period, the vehicle may be configured to restore the position of the electromotive seat to a position thereof prestored by the user (e.g., a prestored seat position). In other words, when the user touches the touch input device multiple times for the predetermined time period, the vehicle may be configured to recognize that the user requests a memory seat function.

As another example, when the user touches a touch area of the second touch input device and drags the finger in a given direction, the vehicle may be configured to adjust the position of the electromotive seat to correspond to the direction of dragging and adjust a distance between the electromotive seat and the steering wheel based on the dragging degree. Additionally, when the user touches the touch area of the touch input device mounted on the steering wheel multiple times for a predetermined time period, the vehicle may be configured to stop the speaker output. Although the same gesture is used, the vehicle may be configured to execute operation of the apparatuses in consideration of characteristics of apparatuses, such as patterns of use, associated with the touch input device.

In other words, the vehicle may be configured to perform different actions in consideration of the touch input device sensing the touch input and characteristics of the apparatuses connected to the touch input device even when the same touch input pattern is sensed. The memory of the vehicle according to an exemplary embodiment may be configured to store data regarding touch input patterns of the user based on apparatuses of the vehicle, and thus the vehicle may be configured to recognize various gestures of the user and perform processes corresponding thereto.

Moreover, the touch input devices receiving the touch inputs may vary according to apparatuses as described above. Thus, despite the same touch input of the user, the operations of the apparatuses of the vehicle may vary. The touch input device according to an exemplary embodiment may operate as a user interface generating the user input the manipulation command more easily within a short period of time. In addition, since the touch input device according to an exemplary embodiment may include the electrode pattern by laser patterning the structure without requiring a separate switch or button, manufacturing costs and weight thereof may be reduced. In addition, the electrode pattern may be inserted to correspond to the shape of the structure, and thus the touch input device according to an exemplary embodiment have high diversity of design.

Although the exemplary embodiments of the present disclosure have been provided for illustrative purposes, those skilled in the art will appreciate that various modifications are possible, without departing from the scope and spirit of the invention as disclosed in the accompanying claims.

Although a few exemplary embodiments of the present disclosure have been shown and described, it would be appreciated by those skilled in the art that changes may be made in these exemplary embodiments without departing from the principles and spirit of the disclosure, the scope of which is defined in the claims and their equivalents.

What is claimed is:

1. A vehicle, comprising:
   at least one touch input device mounted within the vehicle and configured to sense a touch input of a user based on an electrode pattern mounted on a base thereof by forming an electrode on an injection object; and
   a controller configured to operate apparatuses mounted within the vehicle based on the sensed touch input, wherein
   the base of the at least one touch input device includes a first base and a second base stacked on the first base,
   the electrode pattern includes a first electrode pattern and a second electrode pattern, wherein the first electrode pattern includes a first pattern groove formed on a surface of the first base and wherein the second electrode pattern includes a second pattern groove formed on a surface of the second base,
   the first electrode pattern and the second pattern groove are respectively formed in the pattern groove,
   the base is formed of multiple layers, the multiple layers including the first base and the second base,
   the base includes a multi-curved surface shape,
   each of the electrode patterns is designed to correspond to a shape of the base,
   the at least one touch input device is fabricated by forming each of the pattern grooves on the base by emitting laser beams thereto and disposing each of the electrode patterns including a conductive material and a wiring unit configured to connect the each of electrode patterns with a circuit board in each of the pattern grooves, and
   the base includes a metal complex that is reduced to metal when the laser beams are emitted to one surface of the base, thereby forming metal seed in each of the pattern grooves,
   wherein the circuit board is located at a bottom of the touch input device, and
   wherein the electrode patterns are positioned along a top surface of the touch input device.

2. The vehicle according to claim 1, wherein the at least one touch input device is configured to detect a control command of at least one apparatus by sensing a touch input pattern including at least one selected from the group consisting of: the number of repeated touches for a predetermined time period, an intensity of touch, and a direction of dragging after touching.

3. The vehicle according to claim 1, wherein the at least one touch input device includes at least one selected from the group consisting of: a first touch input device configured to receive a control command regarding a side mirror, a second touch input device configured to receive a control command regarding an electromotive seat, and a third touch input device configured to receive a control command regarding a sunroof, via a touch input.

4. The vehicle according to claim 3, wherein the controller is configured to adjust a rotating direction and a rotating degree of the side mirror based on a touch input pattern received via the first touch input device.

5. The vehicle according to claim 3, wherein the controller is configured to adjust a position of the electromotive seat based on a touch input pattern received via the second touch input device.

6. The vehicle according to claim 3, wherein the controller is configured to adjust a direction of opening and closing the sunroof and a degree of opening and closing the sunroof based on a touch input pattern received via the third input device.

7. The vehicle according to claim 1, wherein the controller provides a function notifying service by operating the apparatuses when a touch input is sensed on a touch area of the at least one touch input device for a predetermined first time period.

8. A touch input device, comprising:
   a base;
   an electrode pattern mounted on the base thereof by forming an electrode on an injection object; and
   a circuit board configured to detect a control command by sensing a touch input of a user based on the electrode pattern, wherein
   the base includes a first base and a second base stacked on the first base,
   a pattern groove is formed on a surface of each of the first base and the second base,
   the electrode pattern is formed in the pattern groove,
   the base is formed of multiple layers, the multiple layers including the first base and the second base,
   the base includes a multi-curved surface shape,
   the electrode pattern is designed to correspond to a shape of the base,
   the at least one touch input device is fabricated by forming the pattern groove on the base by emitting laser beams thereto and disposing the electrode pattern including a conductive material and a wiring unit configured to connect the electrode pattern with a circuit board in the pattern groove, and
   the base includes a metal complex that is reduced to metal when the laser beams are emitted to one surface of the base, thereby forming metal seed in the pattern groove,
   wherein the circuit board is located at a bottom of the touch input device, and
   wherein the electrode pattern is positioned along a top surface of the touch input device.

9. The touch input device according to claim 8, wherein the circuit board is configured to detect a control command of at least one apparatus by sensing a touch input pattern including at least one selected from the group consisting of: the number of repeated touches for a predetermined time period, an intensity of touch, and a direction of dragging after touching.

* * * * *